US012634226B2

(12) United States Patent
Karampatsis et al.

(10) Patent No.: US 12,634,226 B2
(45) Date of Patent: May 19, 2026

(54) IMPLEMENTING TRAFFIC CATEGORY IN A WIRELESS COMMUNICATIONS NETWORK

(71) Applicant: Lenovo (Singapore) Pte. Limited, Singapore (SG)

(72) Inventors: Dimitrios Karampatsis, Ruislp (GB); Apostolis Salkintzis, Glika Nera (GR)

(73) Assignee: Lenovo (Singapore) Pte. Limited, Singapore (SG)

( * ) Notice: Subject to any disclaimer, the term of this patent is extended or adjusted under 35 U.S.C. 154(b) by 32 days.

(21) Appl. No.: 18/708,158

(22) PCT Filed: Dec. 14, 2021

(86) PCT No.: PCT/EP2021/085768
§ 371 (c)(1),
(2) Date: May 7, 2024

(87) PCT Pub. No.: WO2023/078578
PCT Pub. Date: May 11, 2023

(65) Prior Publication Data
US 2024/0430194 A1      Dec. 26, 2024

(30) Foreign Application Priority Data
Nov. 8, 2021      (GR) .............................. 20210100776

(51) Int. Cl.
*G06F 15/173*      (2006.01)
*H04L 45/30*      (2022.01)
*H04L 45/302*      (2022.01)

(52) U.S. Cl.
CPC ............ *H04L 45/30* (2013.01); *H04L 45/304* (2013.01); *H04L 45/306* (2013.01)

(58) Field of Classification Search
CPC ...... H04L 45/30; H04L 45/304; H04L 45/306
See application file for complete search history.

(56) References Cited

U.S. PATENT DOCUMENTS

2021/0051562 A1    2/2021   Huang-Fu et al.
2021/0184965 A1*   6/2021   Wang ...................... H04L 45/42
2023/0217347 A1*   7/2023   Fu ......................... H04W 40/02
                                                                      370/254

(Continued)

OTHER PUBLICATIONS

3GPP, "Technical Specification Group Services and System Aspects; Policy and charging control framework for the 5G System (5GS); Stage 2", 3GPP TS 23.503 V17.2.0 retrieved from the internet on May 11, 2024 <https://www.3gpp.org/ftp/Specs/archive/23_series/ 23.503/>, Sep. 2021, 141 pages.

(Continued)

*Primary Examiner* — Joseph R Maniwang
(74) *Attorney, Agent, or Firm* — FIG. 1 Patents

(57) ABSTRACT
There is provided an apparatus comprising: a processor arranged to execute an application; and a receiver arranged to communicate with a wireless communications network, the receiver arranged to receive traffic category information from a network node in the wireless communications network, the network node remote from the apparatus; wherein the processor is further arranged to associate a traffic category to the application using the traffic category information.

20 Claims, 9 Drawing Sheets

(56) References Cited

U.S. PATENT DOCUMENTS

2024/0224163 A1*  7/2024  Starsinic  ..............  H04W 48/18

OTHER PUBLICATIONS

GSMA, "5GJA17_104 LS to 3GPP on Traffic Categories in URSP", 3GPP Draft; S2-2108257, vol. SA WG2, No. Electronic meeting; Nov. 15, 2021-Nov. 22, 2021, Retrieved from the Internet on May 11, 2024 <URL:https://ftp.3gpp.org/tsg_sa/WG2_Arch/T SGS2_148E_Electronic_2021-11/Docs/S2-2108257.zip>, Oct. 29, 2021, 3 pages.

PCT/EP2021/085768 , "International Preliminary Report on Patentability", PCT Application No. PCT/EP2021/085768, May 16, 2024, 9 pages.

PCT/EP2021/085768 , "International Search Report and Written Opinion", International Search Report and Written Opinion, Jul. 8, 2022, 12 pages.

* cited by examiner

100

110

UE Application

141 — Request network connection

146 — Connection established

120

Upper Layer (Mobile OS)

144 — Matching Route Selection Descriptor (DNN, S-NSSAI)

142 — Traffic Descriptor (AppID)

145 — Establish PDU Session

135

URSP Rules

Connection layer (Find matching URSP rule)

143

130

400

Receive traffic category
information
410

Associate a traffic
category to an application
420

Receiving a routing
rule (optional)
430

500

Send traffic category
information to a wireless
communications device
510

IMPLEMENTING TRAFFIC CATEGORY IN A WIRELESS COMMUNICATIONS NETWORK

FIELD

The subject matter disclosed herein relates generally to the field of implementing traffic category in a wireless communications network. This document defines an apparatus, a network node, a method in an apparatus and a method in a network node.

BACKGROUND

User Equipment (UE) Route Selection Policy (URSP) rules and the procedures for a UE to apply URSP rules are described in 3GPP TS 23.502 v17.2.1 and 3GPP TS 23.503 v17.2.0. The URSP rules contain a Traffic Descriptor that allows the UE to determine if a URSP rule matches application traffic. Traffic Descriptors include Application Descriptors which may define the operating system identity (OSID) and the application identity (OSAppID). Traffic Descriptors also include IP flow descriptors such as the target address of application traffic, a requested Data Network Name by the application, and/or a connection capability requested by an application (e.g. an IMS connection).

There are very many unique applications available that may be installed on a UE or, more generally, an apparatus that communicates with a wireless communications network. Furthermore, the total volume of traffic in the wireless communications network serving any one application running on a plurality of apparatuses can increase and decrease quicker than it is possible to update URSP rules.

It is a challenge for an operator of the wireless communications network to manage network traffic by applying URSP rules to apparatuses in respect of each of the vast number of available applications using current systems.

SUMMARY

A problem with existing rule implementations, such as URSP rules, is that they are inflexible. For each application a dedicated URSP rule must be provided at the apparatus to route the traffic of the application within the wireless communication network. Each rule defines a plurality of information fields, which include rule precedence, traffic descriptor, and a list of route selection descriptors, at least. Typically, to ensure that an apparatus applies a particular traffic routing to traffic associated with a particular application, the routing rule in the apparatus must be updated.

Disclosed herein are procedures for implementing traffic category in a wireless communications network. Said procedures may be implemented by apparatus, systems, methods, or computer program products.

There is provided an apparatus comprising a processor and a receiver. The processor is arranged to execute an application. The receiver is arranged to communicate with a wireless communications network, the receiver arranged to receive traffic category information from a network node in the wireless communications network, the network node remote from the apparatus. The processor is further arranged to associate a traffic category to the application using the traffic category information.

The receiver may be further arranged to receive a routing rule defining how the apparatus is to route traffic associated with the traffic category in the wireless communications network. The processor may be further arranged to execute one or more further applications and associate a respective traffic category to at least one of the further applications using the received traffic category information. The processor may be further arranged to associate a traffic category to the application using the traffic category information in response to the at least one application requesting a network connection.

The receiver may be further arranged to receive the traffic category information upon registration with the wireless communications network. The apparatus may further comprise a transmitter, the transmitter arranged to transmit a request for traffic category information. The receiver may be further arranged to receive an address of the network node via Non-Access-Stratum signaling.

The network node may be a Policy Control Function. The traffic category information may be received via Non-Access-Stratum signaling.

There is further provided a network node in a wireless communications network, the network node comprising a transmitter arranged to send traffic category information to a wireless communications device, wherein the traffic category information specifies a traffic category to be associated to an application that is executed by the wireless communications device.

A plurality of wireless communications devices may be arranged to execute the application. The network node may further comprise a controller arranged to determine that traffic category information is required for one or more wireless communications devices. Traffic category information may be provided by a second network node in response to a third network node receiving traffic category information from an Application Function.

There is further provided a method in an apparatus arranged to execute at least one application. The method comprises: receiving traffic category information from a network node in a wireless communications network, the network node remote from the apparatus; and associating a traffic category to the application using the traffic category information.

The method may further comprise receiving a routing rule defining how the apparatus is to route traffic of an application having the traffic category. The method may further comprise associating a traffic category to the application using the traffic category information in response to the at least one application requesting a network connection.

There is further provided a method in a network node of a wireless communications network. The method comprises sending traffic category information to a wireless communications device, wherein the traffic category information specifies a traffic category to be associated to an application that is executed by the wireless communications device.

BRIEF DESCRIPTION OF THE DRAWINGS

In order to describe the manner in which advantages and features of the disclosure can be obtained, a description of the disclosure is rendered by reference to certain apparatus and methods which are illustrated in the appended drawings. Each of these drawings depict only certain aspects of the disclosure and are not therefore to be considered to be limiting of its scope. The drawings may have been simplified for clarity and are not necessarily drawn to scale.

Methods and apparatus for implementing traffic category in a wireless communications network will now be described, by way of example only, with reference to the accompanying drawings, in which.

DETAILED DESCRIPTION

Figure 1:
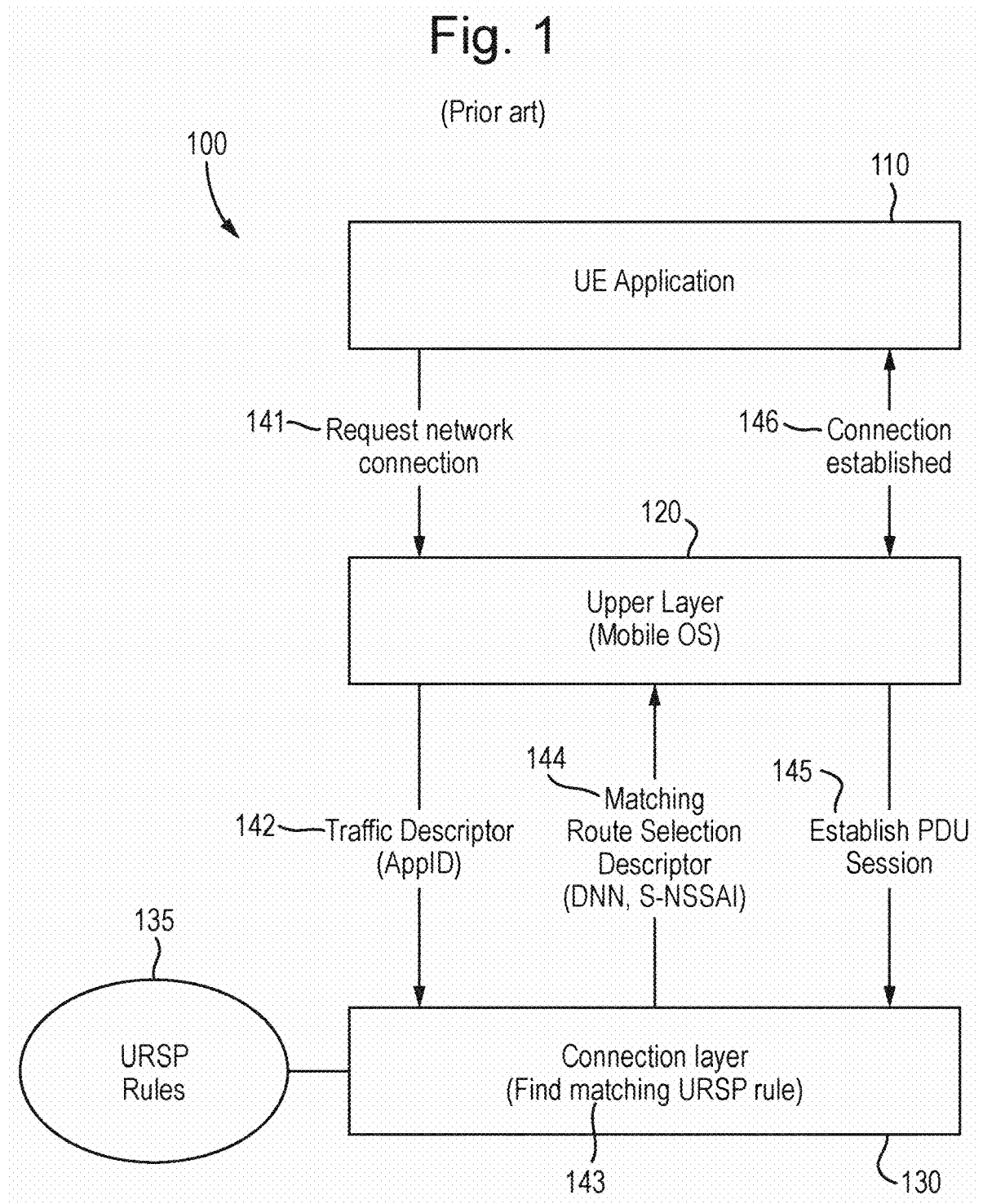
FIG. 1 illustrates a known arrangement whereby a UE routes application traffic via a PDU session that matches Route Selection Descriptor components according to URSP rules.

As will be appreciated by one skilled in the art, aspects of this disclosure may be embodied as a system, apparatus, method, or program product. Accordingly, arrangements described herein may be implemented in an entirely hardware form, an entirely software form (including firmware, resident software, micro-code, etc.) or a form combining software and hardware aspects.

For example, the disclosed methods and apparatus may be implemented as a hardware circuit comprising custom very-large-scale integration ("VLSI") circuits or gate arrays, off-the-shelf semiconductors such as logic chips, transistors, or other discrete components. The disclosed methods and apparatus may also be implemented in programmable hardware devices such as field programmable gate arrays, programmable array logic, programmable logic devices, or the like. As another example, the disclosed methods and apparatus may include one or more physical or logical blocks of executable code which may, for instance, be organized as an object, procedure, or function.

Furthermore, methods and apparatus may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain arrangements, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to an example of a particular method or apparatus, or similar language, means that a particular feature, structure, or characteristic described in connection with that example is included in at least one implementation of the method and apparatus described herein. Thus, reference to features of an example of a particular method or apparatus, or similar language, may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics described herein may be combined in any suitable manner. In the following description, numerous specific details are provided, such as examples of programming, software modules, user selections, network transactions, database queries, database structures, hardware modules, hardware circuits, hardware chips, etc., to provide a thorough understanding of the disclosure. One skilled in the relevant art will recognize, however, that the disclosed methods and apparatus may be practiced without one or more of the specific details, or with other methods, components, materials, and so forth. In other instances, well-known structures, materials, or operations are not shown or described in detail to avoid obscuring aspects of the disclosure.

Aspects of the disclosed method and apparatus are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures.

Since Release 15 onwards of the 3GPP Standard Specifications, User Equipment Route Selection Policy (URSP) rules have been defined to allow a UE to determine how to route application traffic. Application traffic can be routed via:

the mobile communication network by way of 3GPP access, the mobile communication network by way of non-3GPP access, an untrusted WLAN access, a trusted WLAN access, and/or a WLAN connection traffic non-seamlessly bypassing the mobile communication network.

The URSP rules and the procedures for the UE to apply URSP rules are described in 3GPP TS 23.502 v17.2.1 and 3GPP TS 23.503 v17.2.0. The URSP rules contain a Traffic Descriptor that allows the UE to determine if a URSP rule matches application traffic. Application traffic is network traffic associated with an application. Traffic Descriptors include Application Descriptors which may define the operating system identity (OSID) and the application identity (OSAppID). Traffic Descriptors also include IP flow descriptors such as the target address of application traffic, a requested Data Network Name by the application, and/or a connection capability requested by an application (e.g. an IMS connection). Table 1 below shows the list of Traffic Descriptors.

TABLE 1

| UE Route Selection Policy Rule (from 3GPP TS 23.503 v 17.2.0) | | | | |
|---|---|---|---|---|
| Information name | Description | Category | PCF permitted to modify in a UE context | Scope |
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppld(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |

TABLE 1-continued

| Information name | Description | Category | PCF permitted to modify in a UE context | Scope |
|---|---|---|---|---|
| List of Route Selection Descriptors | A list of Route Selection Descriptors. The components of a Route Selection Descriptor are described in table 6.6.2.1-3. | Mandatory | | |

NOTE 1:
Rules in a URSP shall have different precedence values.
NOTE 2:
The information is used to identify the Application(s) that is(are) running on the UE's OS.
The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

Each URSP rule contains a Route Selection Descriptor (RSD) that describes to the UE how to route the Protocol Data Unit (PDU) session. The RSD includes one or more of the following: Session and Service Continuity (SSC) Mode Selection, Network Slice Selection, Data Network Name (DNNN) Selection, PDU Session Type Selection, Non-Seamless Offload indication, Access Type preference. Table 1.2 below describes the RSD components.

TABLE 2

Route Selection Descriptor (from 3GPP TS 23.503 v17.2.0)

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |

TABLE 2-continued

Route Selection Descriptor (from 3GPP TS 23.503 v17.2.0)

| Information name | Description | Category | PCF permitted to modify in URSP | Scope |
|---|---|---|---|---|
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

NOTE 1:
Every Route Selection Descriptor in the list shall have a different precedence value.
NOTE 2:
At least one of the route selection components shall be present.
NOTE 3:
When the Subscription Information contains only one S-NSSAI in UDR, the PCF needs not provision the UE with S-NSSAI in the Network Slice Selection information. The "match all" URSP rule has one S-NSSAI at most.
NOTE 4:
If this indication is present in a Route Selection Descriptor, no other components shall be included in the Route Selection Descriptor.
NOTE 5:
The SSC Mode 3 shall only be used when the PDU Session Type is IP.
NOTE 6:
The Route Selection Descriptor is not considered valid unless all the provided Validation Criteria are met.
NOTE 8:
When the PDU Session Type is "Ethernet" or "Unstructured", this component shall be present.

3GPP TS 23.502 v17.2.1 and 3GPP TS 23.503 v17.2.0 also define that, when the UE starts a registration request, the UE includes in the request its operating system identifier and a list of policy section identifiers (PSIs) where each identifier defines a segment of a URSP rules installed at the UE. The Policy Control Function (PCF) uses the operating system identity (OSID) and the list of PSI to determine if the UE requires updated URSP rules.

FIG. 1 illustrates a known arrangement whereby a UE routes application traffic via a PDU session that matches Route Selection Descriptor components according to URSP rules. FIG. 1 illustrates a UE application 110, an operating system 120, and a connection layer 130 of an apparatus. The apparatus is preferably a user equipment. The apparatus communicates with a wireless communications network. In operation, the Connection layer 130 accesses URSP rules 135.

The operation of the arrangement of FIG. 1 will now be described. At 141, the UE application 110 requests a network connection from the operating system 120 of the apparatus. At 142, the operating system 120 sends a Traffic Descriptor, such as the application identity, to the Connection layer 130. In response thereto, at 143, the Connection layer 130 identifies a URSP rule from a set of available URSP rules 135 stored in the UE and that matches the received Traffic Descriptor. From the identified URSP rule the connection layer 130 determines a Route Selection Descriptor. Subsequently, at 144, the connection layer 130 sends, to the operating system 120, the determined Route Selection Descriptor. At 145, the operating system 120 initiates the establishing of a PDU session according to the Route Selection Descriptor. At 146, when the PDU session is established, the operating system 120 reports, to the UE application 110, that the connection is established.

FIG. 1 merely shows an example implementation within a UE. In practice the exact mechanism for applying routing rules to application traffic is an implementation detail. For example, routing rules can be pre-assigned by the apparatus to every installed application, ready to be recalled and implemented when an application requests a connection. Alternatively, the apparatus may only assign a routing rule to an application when that application requests a connection. The routing rules are stored in the UE and can be updated by the network.

A problem with existing rule implementations, such as URSP rules, is that they are inflexible. Each rules defines a plurality of information fields as exemplified in table 1 above. These information fields include rule precedence, traffic descriptor, and a list of route selection descriptors, at least. There are very many unique applications available that may be installed on an apparatus that communicates with a wireless communications network. As of September 2021, the Google Play app store for Android devices had around 3.5 million applications available; at the same time the Apple app store for iOS devices had over 2 million applications available. Furthermore, the popularity of any given application can increase and decrease relatively quickly. The total volume of traffic in the wireless communications network serving any one application running on a plurality of UEs can accordingly increase and decrease quicker than it is possible to update the URSP rules.

It is a challenge for an operator of the wireless communications network, using current systems, to manage network traffic by applying routing rules (such as URSP rules) to the vast number of available applications.

The present application presents a solution to this problem.

Figure 2:
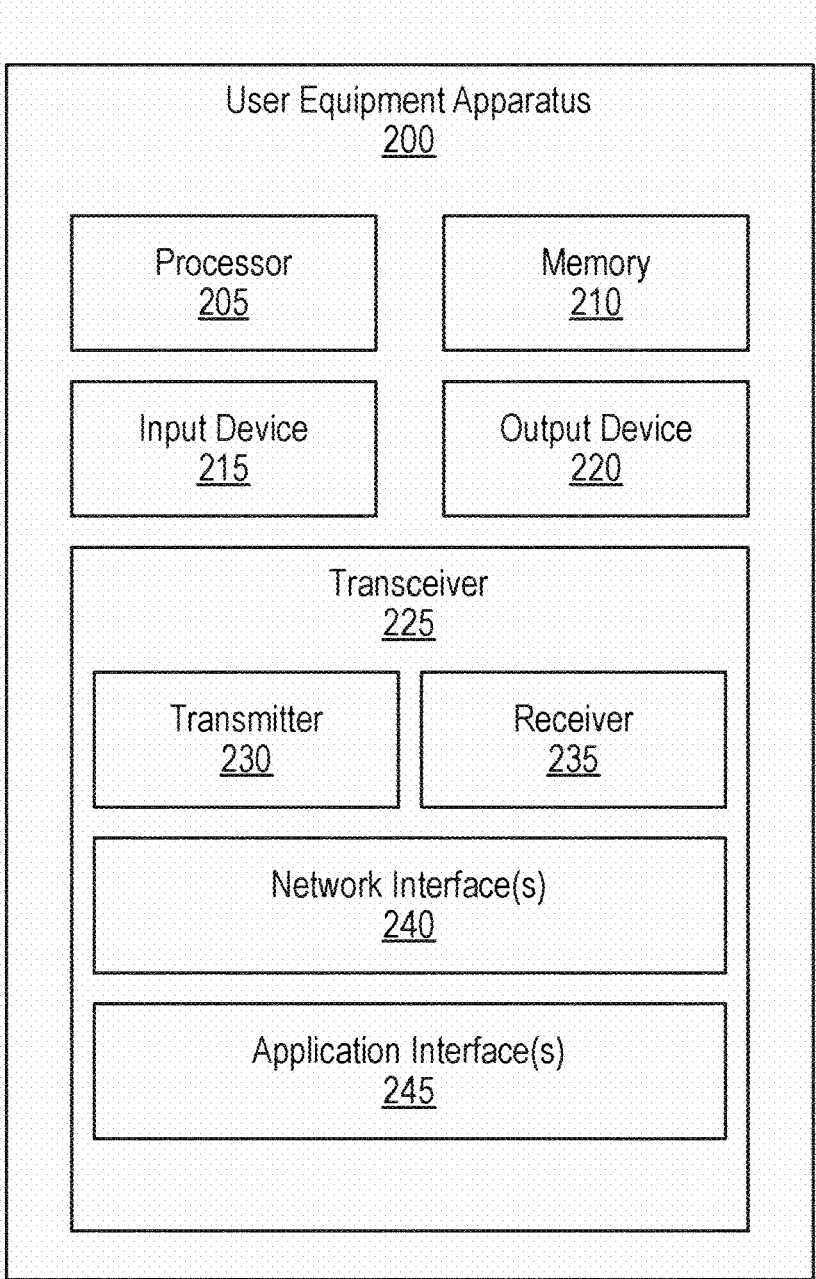
FIG. 2 illustrates an apparatus for implementing traffic categories as described herein.

FIG. 2 illustrates an apparatus 200 for implementing traffic categories as described herein. The apparatus 200 includes a processor 205 and a receiver 235. The apparatus 200 may be user equipment (UE). The processor 205 is arranged to execute an application. The receiver 235 is arranged to communicate with a wireless communications network. The receiver 235 is further arranged to receive traffic category information from a network node in the wireless communications network. The network node is remote from the apparatus. The processor 205 is further arranged to associate or assign a traffic category to the application using the traffic category information.

By delivering traffic category information from a network node in the wireless communications network, the mobile network operator is given control of the mapping between applications and the traffic category, which in turn defines the routing rule that is applied to the traffic associated with the application. This allows the mobile network operator to update how application traffic is routed responsive to network needs.

The receiver 235 and the processor 205 are operably connected. The processor 205 may be further arranged to run an operating system. An application that requires a network connection can request such a network connection from the operating system. Network traffic between the apparatus 200 and the wireless communications network that is sent from or received by the application is traffic associated with the application. Traffic associated with the application may be application traffic. Data sent and received by the application over the wireless communications network may be application traffic. The traffic category is used by the apparatus to determine routing rules that the apparatus uses to route traffic associated with the application, i.e. the application traffic. The routing rules may be defined as User Equipment Route Selection Policy (URSP) rules modified to include a Traffic Category Identifier.

The receiver 235 may be further arranged to receive a routing rule defining how the apparatus 200 is to route traffic associated with the traffic category. The receiver 235 may be further arranged to receive a routing rule defining how the apparatus 200 is to route traffic of an application having the traffic category. The receiver 235 may be further arranged to receive a routing rule defining how the apparatus is to route traffic associated with an application, the application having the traffic category associated therewith. The routing rule may be received independently of the traffic category information. The routing rule may define whether the apparatus 200 routes application traffic: via the mobile communication network either via 3GPP access or via non-3GPP access, via an untrusted or trusted WLAN access, or non-seamlessly bypassing the mobile communication network via a WLAN connection. The routing rule may be a User Equipment Route Selection Policy rule modified to include a Traffic Category Identifier. The routing rule may be delivered to the apparatus in the same was as a URSP rule is delivered to a UE.

By implementing a traffic category field in the routing rules, these routing rules do not need to be updated in response to new applications being released or a particular application becoming popular. Instead, the apparatus 200 can receive updates to the mapping information between application identities and the traffic categories with minimal signaling overhead. This tends to allow the network operator to manage the routing of application traffic with reduced network overhead. The network operator may then choose to more frequently update the traffic category mapping information to optimize application traffic routing.

The traffic category information may comprise a mapping between the application and the traffic category. Each application may be identified by an application identifier. The traffic category information may comprise a mapping between the application identity and the traffic category. The processor may be arranged to run a plurality of applications, and at least one of the plurality of applications may have a traffic category associated or assigned thereto.

The processor 205 may be arranged to execute one or more further applications, and associate a respective traffic category to at least one of the further applications using the received traffic category information.

The processor 205 may be further arranged to associate a traffic category to an application in response to receiving traffic category information from a network node. The processor 205 may be further arranged to associate a traffic category to the application using the traffic category information in response to the at least one application requesting a network connection. The processor 205 may be further arranged to determine when the at least one application requests a network connection. The use of the traffic category associated to the application in the network connection may be implemented by way of an appropriately modified User Equipment Route Selection Policy rule.

The receiver 235 may be further arranged to receive the traffic category information upon the apparatus 200 registering with the wireless communications network.

In this implementation, the apparatus 200 further comprises a transmitter 230. The transmitter 230 is arranged to transmit a request for traffic category information. The transmitter 230 and the processor 205 are operably connected. The transmitter 230 may be arranged to send the request to the network node responsive to the processor 205 determining that updated traffic category information is required. The request for traffic category information comprises an application identity of the application. The traffic category information may comprise a Traffic Category Identifier. The Traffic Category Identifier may be included as part of a Traffic Descriptor in a modified User Equipment Route Selection Policy rule. The traffic category information further comprises a Classifier Body Information Element. The Classifier Body Information Element identifies the body that defines the traffic category. The body may be, for example, 3GPP, GSMA, or the Mobile Network Operator. Different classification bodies may use different traffic category definitions. The Classifier Body Information Element allows such different traffic categories to be differentiated.

The receiver 235 is further arranged to receive an address of the network node via Non-Access-Stratum signaling. The network node may be a Traffic Category Validation Server. The address of the network node may be received from an Access and Mobility management Function (AMF). The address may be received during registration of the apparatus with the wireless communications network. The address of the network node may be provided by a Policy Control Function (PCF) within a UE Configuration Update procedure. The address of the network node may be provided by a Session management function (SMF) within a Protocol Configuration Options (PCO) as a component of Non-Access-Stratum (NAS) message. The apparatus 200 may request the address of the network node upon initiation of a PDU session.

The network node may be a Policy Control Function and the traffic category information may be received via Non-Access-Stratum signaling.

As explained above, FIG. 2 depicts a user equipment apparatus 200 that may be used for implementing the methods described herein. The user equipment apparatus 200 includes a processor 205, a memory 210, an input device 215, an output device 220, and a transceiver 225.

The input device 215 and the output device 220 may be combined into a single device, such as a touchscreen. In some implementations, the user equipment apparatus 200 does not include any input device 215 and/or output device 220.

As depicted, the transceiver 225 includes at least one transmitter 230 and at least one receiver 235. The transceiver 225 may communicate with one or more cells (or wireless coverage areas) supported by one or more base units. The transceiver 225 may be operable on unlicensed spectrum. Moreover, the transceiver 225 may include multiple UE panels supporting one or more beams. Additionally, the transceiver 225 may support at least one network interface 240 and/or application interface 245. The application interface(s) 245 may support one or more APIs. The network interface(s) 240 may support 3GPP reference points, such as Uu, N1, PC5, etc. Other network interfaces 240 may be supported, as understood by one of ordinary skill in the art.

The processor 205 may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. The processor 205 may execute instructions stored in the memory 210 to perform the methods and routines described herein. The processor 205 is communicatively coupled to the memory 210, the input device 215, the output device 220, and the transceiver 225.

The processor 205 may control the user equipment apparatus 200 to implement the above-described UE behaviors. The processor 205 may include an application processor (also known as "main processor") which manages application-domain and operating system ("OS") functions and a baseband processor (also known as "baseband radio processor") which manages radio functions.

The memory 210 may be a computer readable storage medium. The memory 210 may include volatile computer storage media. For example, the memory 210 may include a RAM, including dynamic RAM ("DRAM"), synchronous dynamic RAM ("SDRAM"), and/or static RAM ("SRAM"). The memory 210 may include non-volatile computer storage media. For example, the memory 210 may include a hard disk drive, a flash memory, or any other suitable non-volatile computer storage device. The memory 210 may include both volatile and non-volatile computer storage media.

The memory 210 may store data related to implement a traffic category field as describe above. The memory 210 may also store program code and related data, such as an operating system or other controller algorithms operating on the apparatus 200.

The input device 215 may include any known computer input device including a touch panel, a button, a keyboard, a stylus, a microphone, or the like. The input device 215 may be integrated with the output device 220, for example, as a touchscreen or similar touch-sensitive display. The input device 215 may include a touchscreen such that text may be input using a virtual keyboard displayed on the touchscreen and/or by handwriting on the touchscreen. The input device 215 may include two or more different devices, such as a keyboard and a touch panel.

The output device 220 may be designed to output visual, audible, and/or haptic signals. The output device 220 may include an electronically controllable display or display device capable of outputting visual data to a user. For example, the output device 220 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 220 may include a wearable display separate from, but communicatively coupled to, the rest of the user equipment apparatus 200, such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

The output device 220 may include one or more speakers for producing sound. For example, the output device 220 may produce an audible alert or notification (e.g., a beep or chime). The output device 220 may include one or more haptic devices for producing vibrations, motion, or other haptic feedback. All, or portions, of the output device 220 may be integrated with the input device 215. For example, the input device 215 and output device 220 may form a touchscreen or similar touch-sensitive display. The output device 220 may be located near the input device 215.

The transceiver 225 communicates with one or more network functions of a mobile communication network via one or more access networks. The transceiver 225 operates under the control of the processor 205 to transmit messages, data, and other signals and also to receive messages, data, and other signals. For example, the processor 205 may selectively activate the transceiver 225 (or portions thereof) at particular times in order to send and receive messages.

The transceiver 225 includes at least one transmitter 230 and at least one receiver 235. The one or more transmitters 230 may be used to provide UL communication signals to a base unit of a wireless communications network. Similarly, the one or more receivers 235 may be used to receive DL communication signals from the base unit. Although only one transmitter 230 and one receiver 235 are illustrated, the user equipment apparatus 200 may have any suitable number of transmitters 230 and receivers 235. Further, the transmitter(s) 230 and the receiver(s) 235 may be any suitable type of transmitters and receivers. The transceiver 225 may include a first transmitter/receiver pair used to communicate with a mobile communication network over licensed radio spectrum and a second transmitter/receiver pair used to communicate with a mobile communication network over unlicensed radio spectrum.

The first transmitter/receiver pair may be used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. The first transmitter/receiver pair and the second transmitter/receiver pair may share one or more hardware components. For example, certain transceivers 225, transmitters 230, and receivers 235 may be implemented as physically separate components that access a shared hardware resource and/or software resource, such as for example, the network interface 240.

One or more transmitters 230 and/or one or more receivers 235 may be implemented and/or integrated into a single hardware component, such as a multi-transceiver chip, a system-on-a-chip, an Application-Specific Integrated Circuit ("ASIC"), or other type of hardware component. One or more transmitters 230 and/or one or more receivers 235 may be implemented and/or integrated into a multi-chip module. Other components such as the network interface 240 or other hardware components/circuits may be integrated with any number of transmitters 230 and/or receivers 235 into a single chip. The transmitters 230 and receivers 235 may be logically configured as a transceiver 225 that uses one more common control signals or as modular transmitters 230 and receivers 235 implemented in the same hardware chip or in a multi-chip module.

Figure 3:
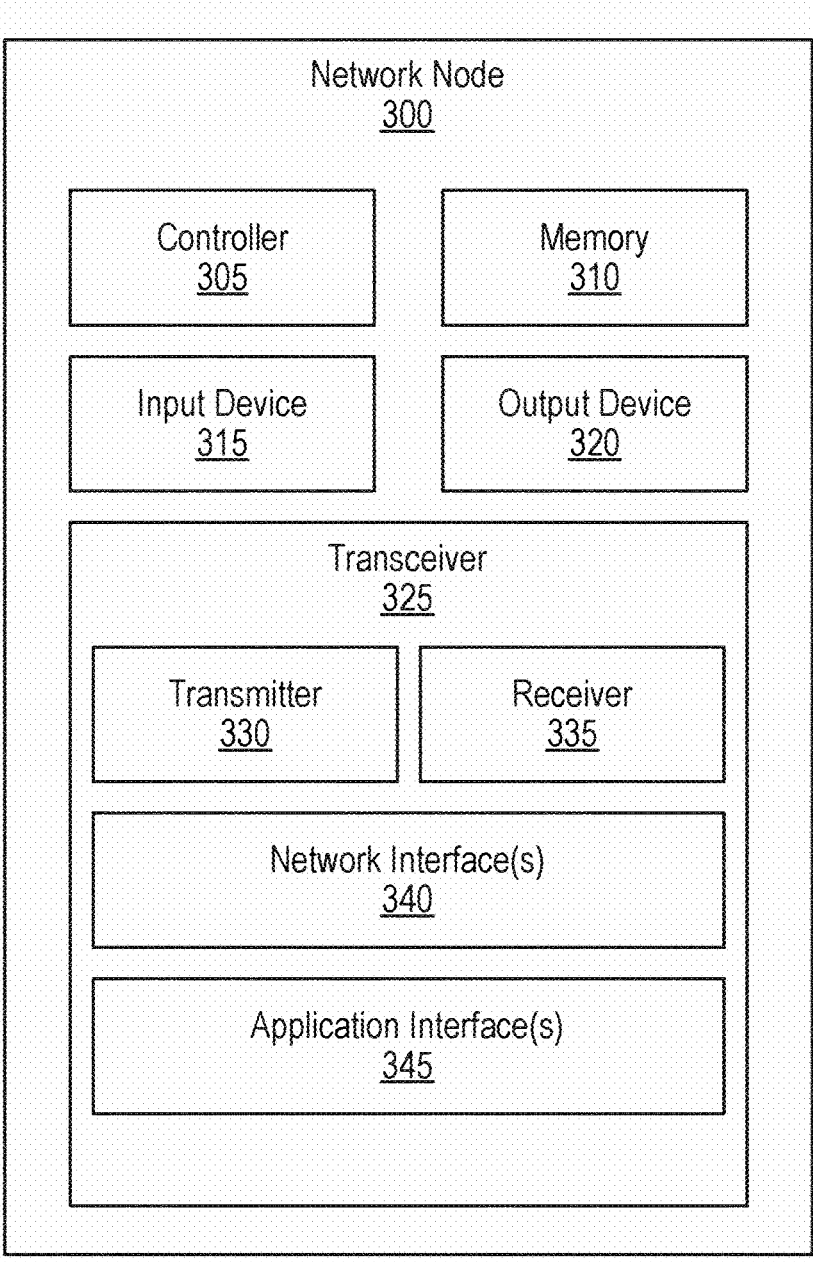
FIG. 3 illustrates a network node for implementing traffic categories in a wireless communications network.

FIG. 3 illustrates a network node 300 for implementing traffic categories in a wireless communications network. The network node 300 may be an application server such as a Traffic Category Validation Server. The network node may be a 3GPP network function, such as, for example, a Policy Control Function. The network node 300 comprises a transmitter 330. The transmitter 330 is arranged to send traffic category information to a wireless communications device (such as the UE apparatus described in more detail earlier above with reference to FIG. 2), wherein the traffic category information specifies a traffic category to be assigned to an application that is installed on the wireless communications device. The wireless communications device may separately receive a routing rule defining how it is to route traffic associated with the traffic category.

The network node 300 may be operated by the operator of the wireless communications network. The operator of the wireless communications network may be a mobile network operator.

A plurality of wireless communications devices may be arranged to execute the application. The network node may further comprise a controller 305 arranged to determine that traffic category information is required for one or more wireless communications devices.

The controller 305 may be arranged to determine that traffic category information is required for one or more wireless communications devices based on subscription information. The subscription information may be received from the Unified Data Repository. The controller 305 may be arranged to determine that traffic category information is required for one or more wireless communications devices based on the current traffic category information provided by the wireless communications device during registration. The wireless communications device may send, in a registration request, the policies currently installed at the device.

Traffic category information may be provided by a second network node in response to a third network node receiving traffic category information from an Application Function. The second network node may be a Unified Data Repository.

FIG. 3 depicts further details of the network node 300 that may be used for implementing the methods described herein. The network node 300 may be one implementation of an entity in the wireless communications network. The network node 300 includes a controller 305, a memory 310, an input device 315, an output device 320, and a transceiver 325.

The input device 315 and the output device 320 may be combined into a single device, such as a touchscreen. In some implementations, the network node 300 does not include any input device 315 and/or output device 320. The network node 300 may include one or more of: the controller 305, the memory 310, and the transceiver 325, and may not include the input device 315 and/or the output device 320.

As depicted, the transceiver 325 includes at least one transmitter 330 and at least one receiver 335. Here, the transceiver 325 communicates with one or more remote units 200. Additionally, the transceiver 325 may support at least one network interface 340 and/or application interface 345. The application interface(s) 345 may support one or more APIs. The network interface(s) 340 may support 3GPP reference points, such as Uu, N1, N2 and N3. Other network interfaces 340 may be supported, as understood by one of ordinary skill in the art.

The controller 305 may include any known controller capable of executing computer-readable instructions and/or capable of performing logical operations. For example, the controller 305 may be a microcontroller, a microprocessor, a CPU, a GPU, an auxiliary processing unit, a FPGA, or similar programmable controller. The controller 305 may execute instructions stored in the memory 310 to perform the methods and routines described herein. The controller 305 is communicatively coupled to the memory 310, the input device 315, the output device 320, and the transceiver 325.

The memory 310 may be a computer readable storage medium. The memory 310 may include volatile computer storage media. For example, the memory 310 may include a RAM, including dynamic RAM ("DRAM"), synchronous dynamic RAM ("SDRAM"), and/or static RAM ("SRAM"). The memory 310 may include non-volatile computer storage media. For example, the memory 310 may include a hard disk drive, a flash memory, or any other suitable non-volatile computer storage device. The memory 310 may include both volatile and non-volatile computer storage media.

The memory 310 may store data related to establishing a multipath unicast link and/or mobile operation. For example, the memory 310 may store parameters, configurations, resource assignments, policies, and the like, as described above. The memory 310 may also stores program code and related data, such as an operating system or other controller algorithms operating on the network node 300.

The input device 315 may include any known computer input device including a touch panel, a button, a keyboard, a stylus, a microphone, or the like. The input device 315 may be integrated with the output device 320, for example, as a touchscreen or similar touch-sensitive display. The input device 315 may include a touchscreen such that text may be input using a virtual keyboard displayed on the touchscreen and/or by handwriting on the touchscreen. The input device 315 may include two or more different devices, such as a keyboard and a touch panel.

The output device 320 may be designed to output visual, audible, and/or haptic signals. The output device 320 may include an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the network node 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

The output device 320 may include one or more speakers for producing sound. For example, the output device 320 may produce an audible alert or notification (e.g., a beep or chime). The output device 320 may include one or more haptic devices for producing vibrations, motion, or other haptic feedback. All, or portions, of the output device 320 may be integrated with the input device 315. For example, the input device 315 and output device 320 may form a touchscreen or similar touch-sensitive display. The output device 320 may be located near the input device 315.

The transceiver 325 includes at least one transmitter 330 and at least one receiver 335. The one or more transmitters 330 may be used to communicate with the UE, as described herein. Similarly, the one or more receivers 335 may be used to communicate with network functions in the PLMN and/or RAN, as described herein. Although only one transmitter 330 and one receiver 335 are illustrated, the network node 300 may have any suitable number of transmitters 330 and receivers 335. Further, the transmitter(s) 330 and the receiver(s) 335 may be any suitable type of transmitters and receivers.

Figures 4, 5:
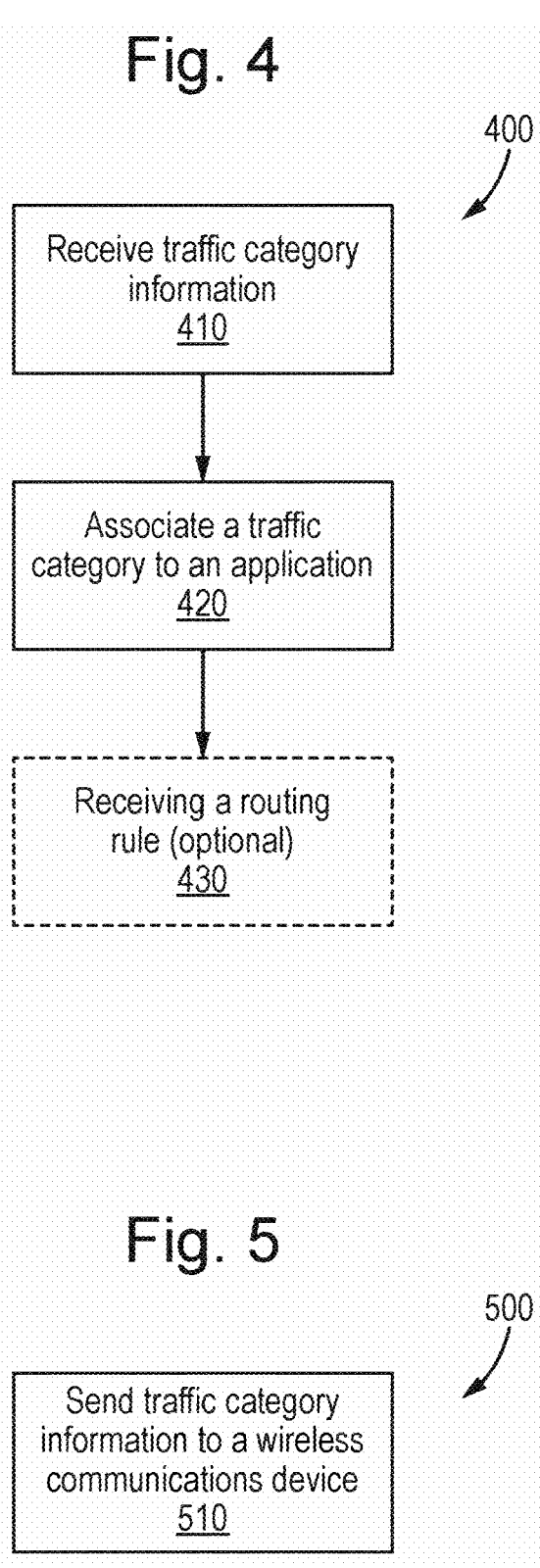
FIG. 4 illustrates a method for implementing traffic categories in an apparatus arranged to execute at least one application.
FIG. 5 illustrates a method for implementing traffic categories in a network node of a wireless communications network.

FIG. 4 illustrates a method 400 for implementing traffic categories in an apparatus arranged to execute at least one application. The method comprises receiving 410 traffic category information from a network node in a wireless communications network. The network node is remote from the apparatus. The method further comprises associating 420 a traffic category to the application using the traffic category information. The associating 420 of a traffic category with the application using the traffic category information may comprise assigning the traffic category to the application using the traffic category information. Associating a traffic category to the application may comprise associating a traffic category with the application.

The apparatus is arranged to communicate with the wireless communications network. The apparatus may be further arranged to run an operating system. An example of the apparatus is illustrated in FIG. 2. An example of the network node is illustrated in FIG. 3. An application that requires a network connection can request such a network connection from the operating system. The traffic category is used by the apparatus to determine traffic routing rules that the apparatus uses to route traffic associated with the application. The traffic routing rules may be defined as modified User Equipment Route Selection Policy rules.

The method 400 may optionally comprise receiving 430 a routing rule defining how the apparatus is to route traffic of an application associated with the traffic category. The apparatus may be further arranged to execute one or more further applications, and the method may further comprise associating a respective traffic category with at least one of the further applications using the received traffic category information.

The method may further comprise associating a traffic category to the application using the traffic category information in response to the at least one application requesting a network connection.

Alternatively or additionally, the method may further comprise associating a traffic category to the application using the traffic category information in response to the apparatus receiving updated traffic category information from the network node. For example, a traffic category that had previously been associated with the application may be updated or changed in response to the apparatus receiving updated traffic category information from the network node.

FIG. 5 illustrates a method 500 for implementing traffic categories in a network node of a wireless communications network. The method 500 comprises sending 510, by the network node, traffic category information to a wireless communications device, wherein the traffic category information specifies a traffic category to be assigned to an application that is executed by the wireless communications device. The wireless communications device may separately receive a routing rule defining how it is to route traffic of an application having the traffic category. An example of the apparatus is illustrated in FIG. 2. An example of the network node is illustrated in FIG. 3. The traffic category information specifies a traffic category to be assigned to an application that is installed on the wireless communications device. The installed application may be capable of being executed by the wireless communications device. The installed application may not be in the process of being executed by the wireless communications device when the traffic category as assigned to the application.

Figure 6:
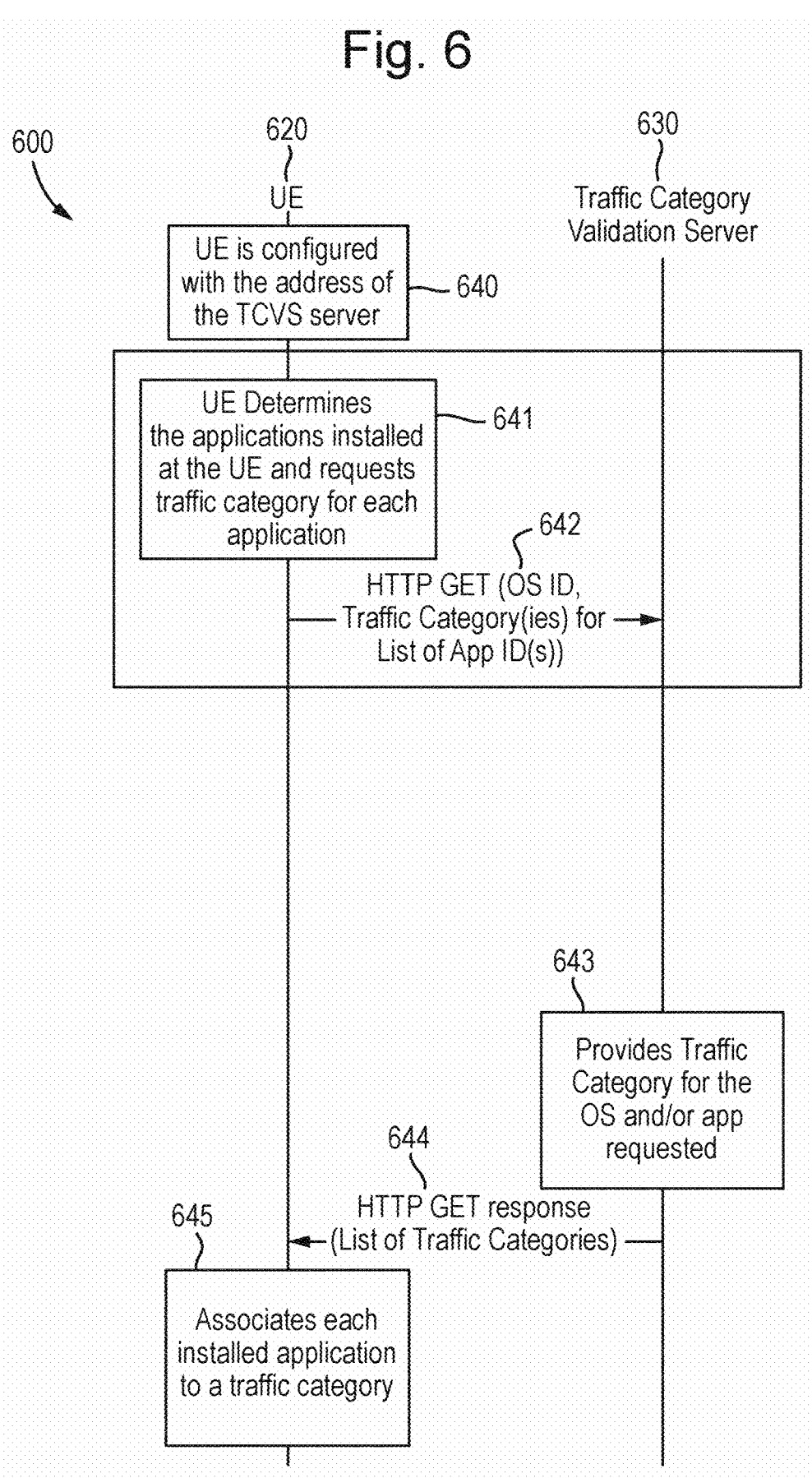
FIG. 6 illustrates a method of provisioning traffic categories from a network node.

FIG. 6 illustrates a method 600 of provisioning traffic categories from a network node which, in this case, is a server in the wireless communications network. The server may be managed by the operator of the wireless communications network. According to the illustrated method 600, the apparatus requests categories for applications installed on the apparatus. An example of the apparatus is illustrated in FIG. 2. An example of the network node is illustrated in FIG. 3. An apparatus, illustrated here as a UE 620, communicates with a server, illustrated here as a Traffic Category Validation Server (TCVS) 630 using a wireless communications network. At 640, the UE 620 is configured with the address of the TCVS 630. The UE 620 may be pre-configured with the address of the TCVS 630. The UE 620 may receive the address of the TCVS 630 in a UE Configuration Update message triggered by a PCF which is received at the UE 620 from an AMF or in the Registration Accept message from the AMF.

Alternatively, the UE 620 may receive the address of the TCVS 630 from the SMF when the UE 620 requests establishment of a PDU session. The UE 620 includes, in a PCO within the PDU session establishment request, an indication to retrieve the TCVS address. In reply, the SMF includes the TCVS address within a PCO in the PDU session establishment accept message. Furthermore, the address of the TCVS 630 may be part of the UE subscription within the Unified Data Management (UDM), and/or User Data Repository (UDR).

After the UE 620 discovers the TCVS 630, the UE 620 determines that it requires traffic categories. The UE 620 discovers the TCVS 630 based on the address configured at the UE 620. The address may be comprised of a TCVS realm. In such a case the UE utilizes a DNS query to resolve the address of the TCVS 630. The UE 620 may determine it requires traffic categories when a new application is installed or when the UE 620 switches on, or when the UE 620 receives routing rules as described herein that contain Traffic Category identifiers (see Table 3 below and associated description). The UE 620 may require periodic updates to the traffic categories, accordingly, the UE 620 may run a timer such that after a predetermined time period has elapsed the UE requests an update of the traffic categories and resets the timer. The timer runs for the predetermined period of time.

According to the illustrated method 600, the UE 620 requests categories for applications installed thereon. At 641 the UE 620 constructs a list of the identities of installed applications for which traffic categories are required. The list may comprise the identities of all the applications installed on the UE 620. The list may comprise the identities of a subset of the applications installed on the UE 620. The subset may be determined according to a criterion such as applications that have used more than a threshold amount of traffic volume in a recent window of operation of the UE 620.

At 642, the UE 620 transmits a request such as an HTTP GET request for traffic categories of the installed applications for which a traffic category is required. The request is transmitted to the TCVS 630. The request comprises the list of identities of the applications for which the UE 620 requires traffic categories. The request also comprises an identifier of the operating system and the version of the operating system that the UE 620 runs (i.e. iOS, Android etc).

At 643, the TCVS 630 receives the request and identifies the traffic categories for the application identities listed in the request. The TCVS 630 comprises a database of application identities and traffic categories assigned thereto. The TCVS 630 is a node in the wireless communications network. The TCVS 630 is operated by the operator of the wireless communications network. The operator of the wireless communications networks thus maintains the database of application identities and traffic categories assigned thereto. The operator of the wireless communications network may thus determine and set the traffic category for any particular application. The operator of the wireless communications network may elect to only set traffic categories for certain applications such as popular applications, or only for applications that generate more than a threshold volume of traffic in the wireless communications network. The threshold volume of traffic in the wireless communications network may be defined for a particular window of operation.

At 644, the TCVS 630 replies to the UE 620 with an HTTP Get response which provides a mapping of application identities to traffic categories. The mapping may be a mapping of Application ID to one or more traffic categories or a mapping of a traffic descriptor (e.g. IP flow information, DNN, connection capability) to one or more traffic categories. The TCVS 630 may reply with a mapping of application identities to traffic category for only a subset of the application identities requested at 642.

At 645, the UE 620 associates or assigns traffic categories to one or more of the applications installed thereon according to the information received in step 644. Subsequently, when an installed application for which a traffic category is associated requests a connection, the UE 620 establishes a connection according to a routing rule associated with that traffic category. Where the UE 620 does not receive a requested traffic category for a particular application identity, the UE 620 uses default traffic routing for traffic resulting from the application having that particular application identity.

Figure 7:
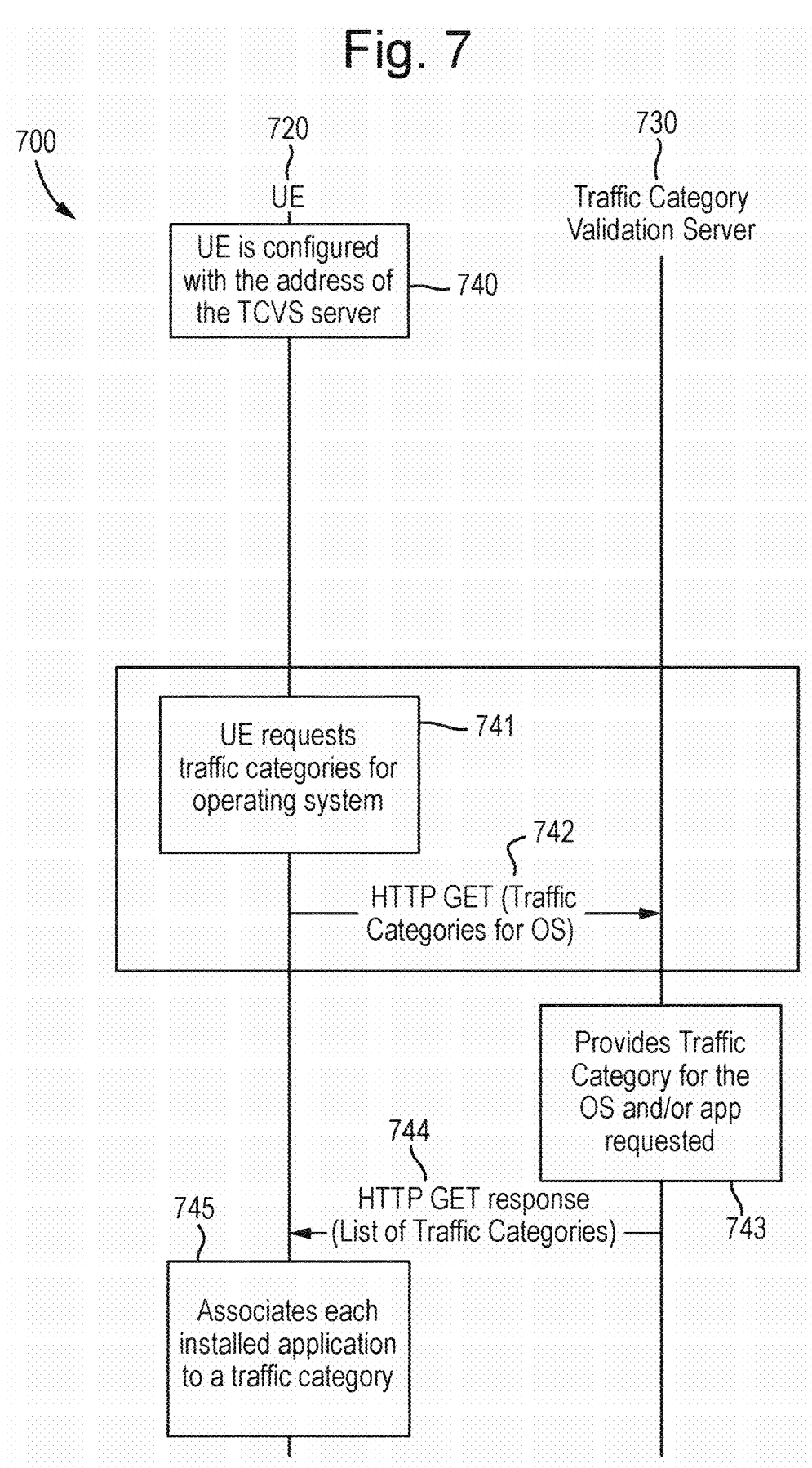
FIG. 7 illustrates an alternative method of provisioning traffic categories from a network node.

FIG. 7 illustrates an alternative method 700 of provisioning traffic categories from a network node. In the case of method 700, the network node is a server. An example of the apparatus is illustrated in FIG. 2. An example of the network node is illustrated in FIG. 3. According to the illustrated method 700, the apparatus requests categories for applications installed thereon. An apparatus, illustrated here as a UE 720, communicates with the server, illustrated here as a Traffic Category Validation Server (TCVS) 730, using a wireless communications network. At 740, the UE 720 is configured with the address of the TCVS 730. The address may, for example, be pre-configured at the UE 720 or may be provided during Registration (for example in the Registration Accept message) or when the AMF triggers a UE configuration Update. The address of the TCVS 730 may be part of the UE subscription within the Unified Data Management (UDM), and/or User Data Repository (UDR).

After the UE 720 discovers the TCVS 730, the UE 720 determines that it requires traffic categories. The UE 720 may determine it requires traffic categories when a new application is installed, when the UE 720 switches on, or when the UE 720 receives URSP rules as described herein that contain Traffic Category identifiers (see Table 3 below and associated description). The UE 620 may require periodic updates to the traffic categories, accordingly, the UE 620 may run a timer such that after a predetermined time period has elapsed the UE requests an update of the traffic categories and resets the timer. The timer runs for the predetermined period of time.

According to the illustrated method 700, the UE 720 requests categories for the operating system of the UE 720. At 741, the UE 720 sends a request to receive traffic categories for the operating system that it runs. Compared to the method 600 of FIG. 6, the method 700 of FIG. 7 is a simplified approach that does not require the UE 720 to maintain a list of the identities of applications installed at the UE 720.

At 742, the UE 720 transmits a request, such as an HTTP GET request, for traffic categories of applications available for the operating system that the UE 720 runs. The request is transmitted to the TCVS 730. The request may also comprise the version of the operating system that the UE 720 runs.

At 743, the TCVS 730 receives the request and identifies the traffic categories that have been set of applications available for the operating system identified in the request. The TCVS 730 comprises a database of application identities, the operating system that the application having the application identity is compatible with, and traffic categories assigned to the application identities. The TCVS 730 is a node in the wireless communications network. The TCVS 730 is operated by the operator of the wireless communications network. The operator of the wireless communications networks thus maintains the database of application identities and traffic categories assigned thereto. The operator of the wireless communications network may thus determine and set the traffic category for any particular application. The operator of the wireless communications network may elect to only set traffic categories for a subset of applications. The subset of applications may comprise, for example, popular applications, or only for applications that generate more than a threshold volume of traffic in the wireless communications network. The threshold volume of traffic in the wireless communications network may be defined for a particular window of operation.

At 744, the TCVS 730 replies to the UE 720 with an HTTP Get response which provides a mapping of application identities to traffic category. The mapping may be a mapping of Application ID to one or more traffic categories or a mapping of a traffic descriptor (e.g. IP flow information, DNN, connection capability) to one or more traffic categories.

At 745, the UE 720 associates traffic categories to the applications installed thereon according to the information received in step 744. Subsequently, when an installed application for which a traffic category is associated requests a network connection, the UE 720 establishes a network connection according to a routing rule associated with that traffic category. Where the UE 720 does not receive a requested traffic category for a particular application identity, the UE 720 uses default traffic routing for traffic resulting from the application having that particular application identity.

Table 3 below gives an example of a modified routing rule that includes a traffic category identifier that identifies a traffic category. This is a modified version of a UE Route Selection Descriptor rule defined in the 3GPP standards. The routing rule comprises the same fields as the UE Route Selection Descriptor rule defined in the 3GPP standards, with the addition of a Traffic Category field. The Traffic Category field may comprise a Traffic Category Identity, and optionally an operating system identity. A UE considers a rule with a particular Traffic Category Identity matched to an application identity when the application identity is associated with a traffic category matching the Traffic Category Identity.

TABLE 3

Including Traffic Category within a modified URSP rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |

TABLE 3-continued

Including Traffic Category within a modified URSP rule

| Information name | Description | Category | PCF permitted to modify in a UE context | Scope |
|---|---|---|---|---|
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| Traffic Category | Consists of OSid (optional) and a Traffic Category ID. A UE considers this rule matched when traffic of an application is associated to the traffic category ID. | | | |
| List of Route Selection Descriptors | A list of Route Selection Descriptors. The components of a Route Selection Descriptor are described in table 6.6.2.1-3. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

Figure 8:
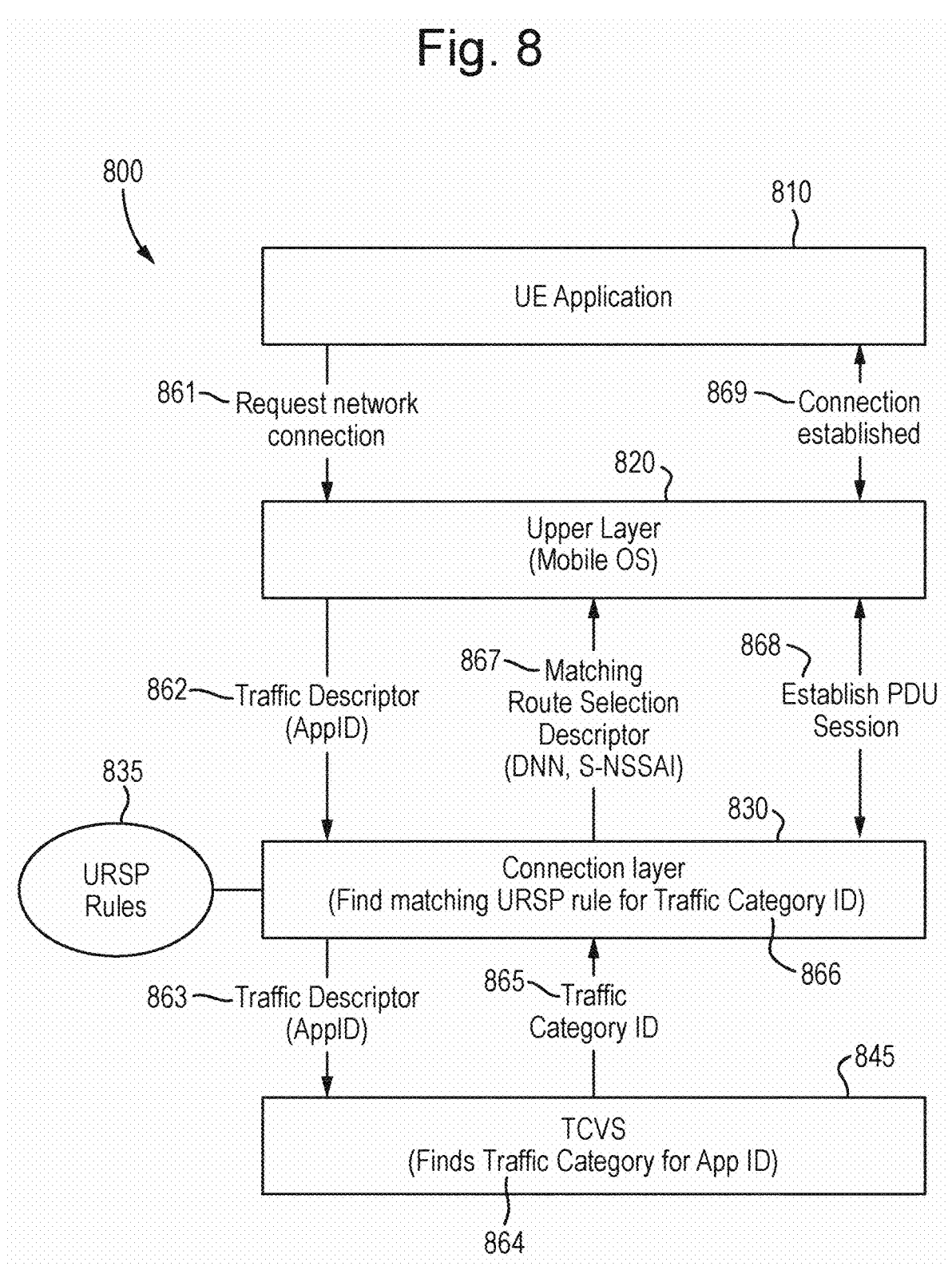
FIG. 8 is a signaling diagram illustrating a UE detecting application traffic and identifying how the associated traffic should be routed using a traffic category of the detected application.

FIG. 8 is a signaling diagram 800 whereby a UE detects application traffic and identifies how the associated traffic should be routed using a traffic category of the detected application. The traffic category associated with an application is used to locate a routing rule, which may be a URSP rule modified to include a Traffic Category Identifier. When the UE detects application traffic the UE identifies how the associated traffic category of the detected application is associated to a URSP rule containing a traffic category identifier as traffic descriptor. If there is a match the UE uses the Route Selection Descriptor of the matched URSP rule.

FIG. 8 illustrates a UE application 810, an operating system 820, and a connection layer 830 of an apparatus which is preferably a user equipment (UE). An example of the apparatus is illustrated in FIG. 2. An example of the network node is illustrated in FIG. 3. The operating system 820 may be considered as an upper layer within the UE. The apparatus communicates with a wireless communications network. The Traffic Category Validation Server (TCVS)

845 of the wireless communications network is illustrated. In operation, the connection layer 830 accesses URSP rules 835 stored in the apparatus.

The operation of the arrangement of FIG. 8 will now be described. At 861, an application 810 in the UE requests a network connection from the operating system 820. At 862, the mobile operating system 820 sends a request for a network connection to the connection layer 830, the request including the identity (AppID) of the application. At 863, the connection layer 830 sends the application identity to the TCVS 845. At 864, the TCVS 845 identifies a Traffic Category ID based on the identity of the application received from the connection layer 830. At 865, the TCVS 845 returns the identified Traffic Category ID to the connection layer 830. At 866, the connection layer 830 finds a matching routing rule based on the received Traffic Category ID. The routing rule defines a Route Selection Descriptor. At 867, the connection layer 830 sends the Route Selection Descriptor to the operating system 820. At 868, a PDU session is established between the operating system 820 and the con-nection layer 830. The PDU session is established based on the Route Selection Descriptor of the matched routing rule. At 869, the operating system 820 notifies the application 810 that a connection/PDU session is established. The applica-tion 810 may then send and receive application traffic using the established connection.

FIG. 8 merely shows an example implementation within a UE. In practice the exact mechanism for applying routing rules and traffic categories to application traffic is an imple-mentation detail. For example, routing rules can be pre-assigned by the apparatus to every installed application, ready to be recalled and implemented when an application requests a connection. Alternatively, the apparatus my only assign a routing rule to an application according to the assigned traffic category when that application requests a connection. Alternatively, the apparatus may associate an application to a traffic category when receiving traffic cat-egory information from a network node. The apparatus then applies a routing rule containing a matched traffic category when the application requests a network connection.

Figure 9:
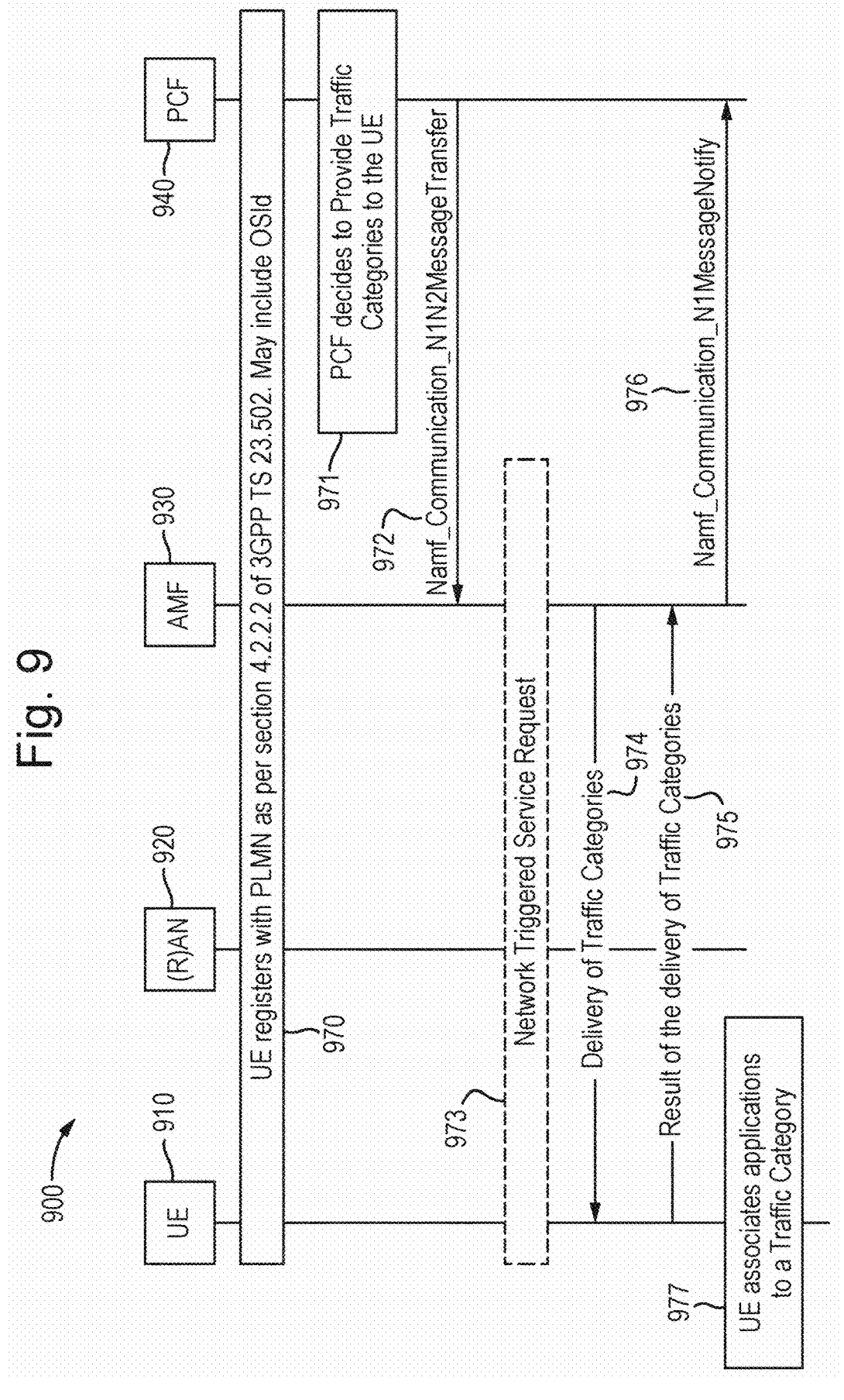
FIG. 9 is a signaling diagram that illustrates traffic categories provided to the UE via NAS signaling.

FIG. 9 is a messaging diagram 900 that illustrates traffic categories provided to the UE 910 via NAS signalling. UE 910 communicates with a wireless communications net-work. FIG. 9 illustrates the UE 910, a radio access network 920, an Access and Mobility management Function (AMF) 930, and a Policy Control Function (PCF) 940. An example of the UE 910 is illustrated in FIG. 2. An example of the PCF 940 is illustrated in FIG. 3. The AMF 930 and PCF 940 are nodes within the wireless communications network. The messaging diagram 900 shows traffic categories being pro-visioned to the UE 910 from the PCF 940, and further a mapping of applications to one or more traffic categories are provided from the PCF 940 to the UE 910 via NAS signalling in a UE configuration update procedure. The PCF 940 may determine the traffic categories the UE 910 requires based on the operating system supported by the UE 910.

At 970, the UE 910 registers to the Public Land Mobile Network (PLMN) as defined by 3GPP TS 23.502. The UE 910 sends, as part of the registration procedure, the operat-ing system identity (OSId) of its operating system and a list of Policy Sections (identified by a Public Service Identity (PSI) installed at the UE. During registration, the AMF 930 selects a PCF, in this case PCF 940, for Application Man-agement and Session Management policies. At 971, the PCF 940 determines that traffic categories per application are needed to be provided to the UE 910. The PCF 940 may make this determination based on a missing PSI not installed at the UE 910. Alternatively, the PCF 940 may make this determination based upon a PSI provided by the UE 910 that maps to traffic category information that requires updating. In another alternative, the PCF 940 determines that traffic categories per application are needed to be provided to the UE 910 upon receipt of a trigger from the Unified Data Management (UDM), and/or User Data Repository (UDR).

At 972, the PCF 940 sends the mapping of an application to one or more traffic categories to the AMF 930 via an Namf_Communication_N1N2Message transfer service operation.

If the UE 910 is in idle mode, the AMF 930 triggers a network triggered service request at 973. At 974, the AMF 930 transparently sends the traffic categories to the UE 910 via a NAS Downlink transport message. At 975, the UE 910 installs the traffic categories and provides the result to the AMF 930 via a NAS Uplink transport message. At 976, the AMF 930 forwards the ack to the PCF 940. At 977, the UE 910 associates one or more of its installed applications to a respective traffic category (or one or more traffic categories) according to the traffic categories received in 965.

Figure 10:
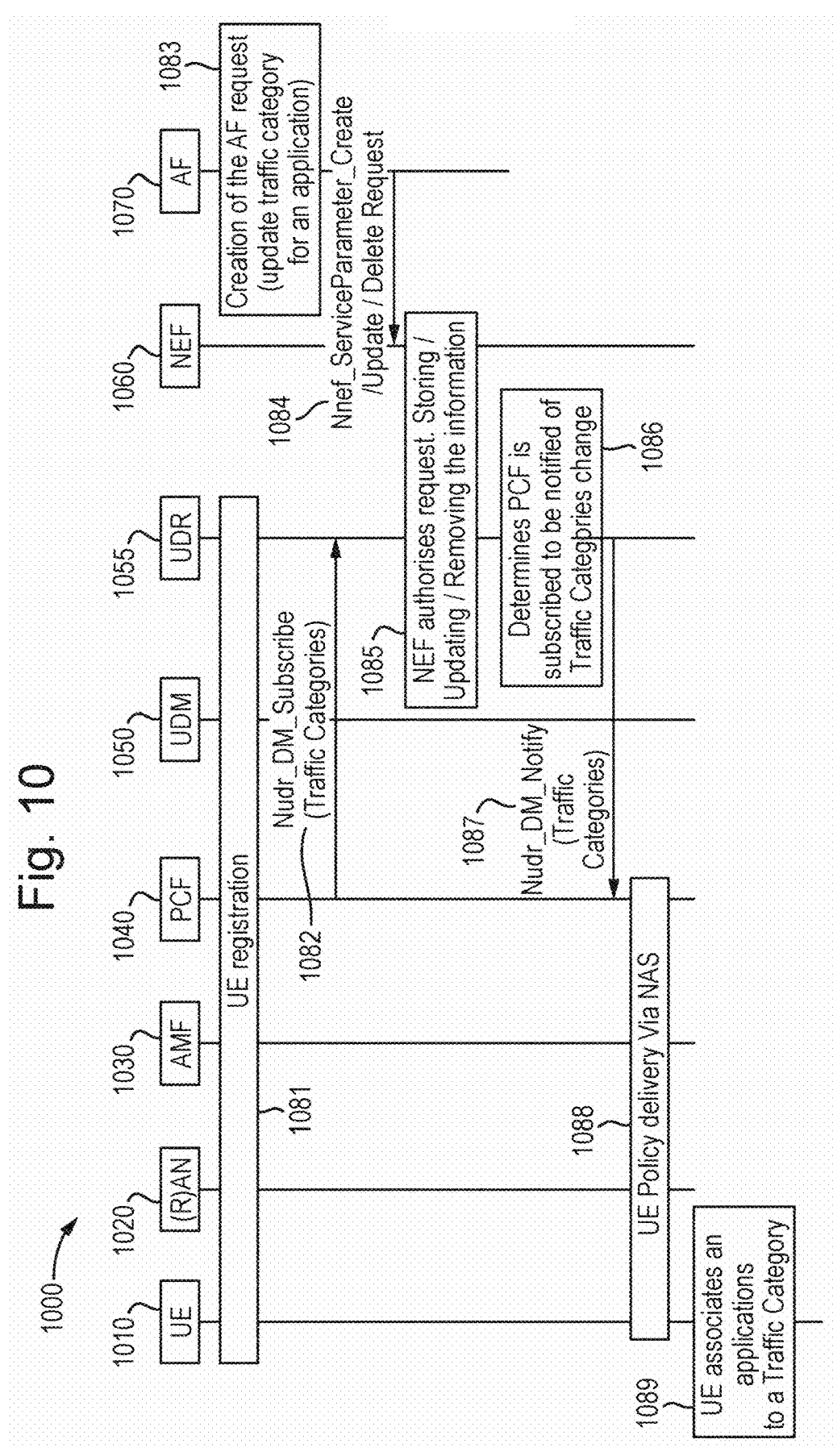
FIG. 10 is a signaling diagram that illustrates the traffic category for an application being provided by an Application Function.

FIG. 10 is a messaging diagram 1000 that illustrates the traffic category for an application being provided by an Application Function. UE 1010 communicates with a wire-less communications network. The wireless communica-tions network comprises a radio access network (RAN) 1020, an Access and Mobility management Function (AMF) 230, a Policy Control Function (PCF) 1040, a Unified Data Management (UDM) 1050, a User Data Repository (UDR) 1055, a Network Exposure Function (NEF) 1060, and an Application Function (AF) 1070. An example of the UE 1010 is illustrated in FIG. 2. An example of the AF 1070 is illustrated in FIG. 3.

At 1081, the UE 1010 registers with the Public Land Mobile Network (PLMN) as per 3GPP TS 23.502. At 1082, the PCF 1040 subscribes from the UDR 1055 to be notified of change/update of Traffic Categories. The subscription facilitates the PCF 1040 delivering updated Traffic Catego-ries to the UE 1010. At 1083, the AF 1070 updates or creates a traffic category for an application or a list of traffic categories for a list of applications. The change or creation of a Traffic Category for an application may be a decision made by an operator of the wireless communications net-work.

At 1084, the AF 1070 sends an AF request via the Service Based Interface (SBI) to the NEF 1060. At 1085, the NEF 1060 authorizes the request and stores the traffic category in the UDR 1055. At 1086, the UDR 1055 receives the autho-rization from the NEF 1060 and determines that the PCF 1040 is to be to be notified with the updated traffic catego-ries. At 1087, the UDR notifies the PCF 1040 in a Nudr_DM_Notify service operation that delivers the traffic categories to the PCF 1040. At 1088, the PCF 1040 sends the Traffic Categories to the UE 1010 via a NAS signaling using the UE Configuration Update procedure. At 1089, the UE associates its installed application to an application category according to the traffic categories received in 1088.

Based on step 1088, the PCF 1040 determines updated URSP rules for the UE and provides these to the UE as described in FIG. 8. Alternatively, the URSP rules may be provided by the AF 1070 (in addition to the traffic catego-ries) in step 1081 of FIG. 10. The UE 1010 receives the modified URSP rules that include traffic categories as described in Table 3 above.

It should be noted that the above-mentioned methods and apparatus illustrate rather than limit the invention, and that those skilled in the art will be able to design many alternative arrangements without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Further, while examples have been given in the context of particular communications standards, these examples are not intended to be the limit of the communications standards to which the disclosed method and apparatus may be applied. For example, while specific examples have been given in the context of 3GPP, the principles disclosed herein can also be applied to another wireless communications system, and indeed any communications system which uses routing rules.

The method may also be embodied in a set of instructions, stored on a computer readable medium, which when loaded into a computer processor, Digital Signal Processor (DSP) or similar, causes the processor to carry out the hereinbefore described methods.

The described methods and apparatus may be practiced in other specific forms. The described methods and apparatus are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
    at least one memory; and
    at least one processor coupled with the at least one memory and operable to cause the UE to:
        receive, from a network node remote from the UE, signaling that indicates for the UE to apply respective routing rules to a plurality of traffic categories and that indicates a mapping between a plurality of applications executable by the UE and the plurality of traffic categories; and
        route, based at least in part on a routing rule of the respective routing rules and the mapping, application data corresponding to an application of the plurality of applications, wherein the application is mapped to a traffic category of the plurality of traffic categories, and wherein the routing rule corresponds to the traffic category.

2. The UE of claim 1, wherein the plurality of applications are associated with respective traffic categories of the plurality of traffic categories based at least in part on traffic category information in the respective routing rules.

3. The UE of claim 2, wherein to route the application data, the at least one processor is further operable to cause the UE to determine if an application identifier associated with the application is matching the traffic category corresponding to the routing rule.

4. The UE of claim 1, wherein the at least one processor is further operable to cause the UE to route, based at least in part on an additional routing rule of the respective routing rules and the mapping, additional application data corresponding to an additional application of the plurality of applications, wherein the additional application is mapped to an additional traffic category of the plurality of traffic categories, and wherein the additional routing rule corresponds to the additional traffic category.

5. The UE of claim 1, wherein to route the application data, the at least one processor is operable to cause the UE to:
    obtain, from the application, a request for a network connection; and
    associate the traffic category to the application in response to the application requesting the network connection.

6. The UE of claim 1, wherein the signaling is received upon registration with a wireless communications network.

7. The UE of claim 1, wherein the at least one processor is further operable to cause the UE to transmit a request for the mapping between the plurality of applications and the plurality of traffic categories.

8. The UE of claim 1, wherein the at least one processor is further operable to cause the UE to receive an address of the network node via Non-Access-Stratum (NAS) signaling.

9. The UE of claim 1, wherein the network node is a Policy Control Function (PCF) and the mapping between the plurality of applications and the plurality of traffic categories is received via Non-Access-Stratum (NAS) signaling.

10. The UE of claim 1, wherein the respective routing rules comprise a plurality of parameters, and wherein at least one parameter of the plurality of parameters indicates one or more traffic categories applicable to the respective routing rules.

11. The UE of claim 1, wherein to route the application data, the at least one processor is further operable to cause the UE to:
    establish a protocol data unit (PDU) session based at least in part on a route selection descriptor associated with the routing rule; and
    communicate the application data over the PDU session.

12. A network node for wireless communications, comprising:
    at least one memory; and
    at least one processor coupled with the at least one memory and operable to cause the network node to:
        transmit signaling that indicates for a user equipment (UE) to apply respective routing rules to a plurality of traffic categories and that indicates a mapping between a plurality of applications executable by the UE and the plurality of traffic categories, wherein application data corresponding to an application of the plurality of applications is routed based at least in part on a routing rule of the respective routing rules and the mapping, wherein the application is mapped to a traffic category of the plurality of traffic categories, and wherein the routing rule corresponds to the traffic category.

13. The network node of claim 12, wherein to transmit the signaling, the at least one processor is operable to cause the network node to determine that the mapping between the plurality of applications and the plurality of traffic categories is required for one or more UEs of a plurality of UEs, wherein the one or more UEs comprises the UE.

14. The network node of claim 12, wherein the at least one processor is further operable to cause the network node to receive the mapping between the plurality of applications and the plurality of traffic categories from a second network node in response to a third network node receiving mapping between the plurality of applications and the plurality of traffic categories from an Application Function (AF).

15. A method performed by a user equipment (UE), the method comprising:
    receiving, from a network node remote from the UE, signaling that indicates for the UE to apply respective routing rules to a plurality of traffic categories and that indicates a mapping between a plurality of applications executable by the UE and the plurality of traffic categories; and routing, based at least in part on a routing rule of the respective routing rules and the mapping, application data corresponding to an application of the plurality of applications, wherein the application is mapped to a traffic category of the plurality of traffic categories, and wherein the routing rule corresponds to the traffic category.

16. The method of claim 15, wherein the plurality of applications are associated with respective traffic categories of the plurality of traffic categories based at least in part on traffic category information in the respective routing rules.

17. The method of claim 16, further comprising routing, based at least in part on an additional routing rule of the respective routing rules and the mapping, additional application data corresponding to an additional application of the plurality of applications, wherein the additional application is mapped to an additional traffic category of the plurality of traffic categories, and wherein the additional routing rule corresponds to the additional traffic category.

18. A method performed by a network node, the method comprising transmitting signaling that indicates for a user equipment (UE) to apply respective routing rules to a plurality of traffic categories and that indicates a mapping between a plurality of applications executable by the UE and the plurality of traffic categories, wherein application data corresponding to an application of the plurality of applications is routed based at least in part on a routing rule of the respective routing rules and the mapping, wherein the application is mapped to a traffic category of the plurality of traffic categories, and wherein the routing rule corresponds to the traffic category.

19. The method of claim 18, wherein transmitting the signaling comprises determining that the mapping between the plurality of applications and the plurality of traffic categories is required for one or more UEs of a plurality of UEs, wherein the one or more UEs comprises the UE.

20. The method of claim 18, further comprising receiving the mapping between the plurality of applications and the plurality of traffic categories from a second network node in response to a third network node receiving mapping between the plurality of applications and the plurality of traffic categories from an Application Function (AF).

* * * * *